United States Patent
Mohr et al.

(10) Patent No.: US 11,188,412 B2
(45) Date of Patent: Nov. 30, 2021

(54) SYSTEM AND METHOD FOR IMPROVING SERVER USAGE BASED ON ANOMALY DETECTION

(71) Applicant: DELL PRODUCTS, LP, Round Rock, TX (US)

(72) Inventors: Rodrigo F. Mohr, Porto Alegre (BR); Marcio F. S. Lena, Porto Alegre (BR); Rodrigo da Rosa Righi, Sao Leopoldo (BR); Cristiano André da Costa, Porto Alegre (BR); Luiz Ricardo Bertoldi de Oliveira, Sao Leopoldo (BR)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 16/701,779

(22) Filed: Dec. 3, 2019

(65) Prior Publication Data

US 2021/0165709 A1 Jun. 3, 2021

(51) Int. Cl.
*G06F 11/07* (2006.01)
*G06N 20/10* (2019.01)
*G06F 11/34* (2006.01)

(52) U.S. Cl.
CPC ...... *G06F 11/0793* (2013.01); *G06F 11/0727* (2013.01); *G06F 11/0748* (2013.01); *G06F 11/0754* (2013.01); *G06F 11/3452* (2013.01); *G06N 20/10* (2019.01)

(58) Field of Classification Search
CPC ............ G06F 11/0793; G06F 11/3452; G06F 11/0727; G06F 11/0754; G06F 11/0757; G06F 11/076; G06F 11/0748; G06F 11/3072; G06F 11/3075; G06F 11/3082; G06F 11/3447; G06F 20/10; G06K 9/6218; G06K 9/6219; G06K 9/622; G06K 9/6221; G06K 9/6224; G06K 9/6226; G06K 9/6255; G06K 9/6256; G06K 9/6267–6278
See application file for complete search history.

(56) References Cited

U.S. PATENT DOCUMENTS

| 7,461,063 | B1* | 12/2008 | Rios ................... G06F 17/18 |
| 2004/0093460 | A1 | 5/2004 | Verdum et al. |
| 2011/0208495 | A1* | 8/2011 | Yuta .................... G06F 17/18 |
| | | | 703/2 |
| 2012/0254414 | A1* | 10/2012 | Scarpelli ............ G06F 11/3452 |
| | | | 709/224 |

(Continued)

*Primary Examiner* — Gabriel Chu
(74) *Attorney, Agent, or Firm* — Larson Newman, LLP

(57) ABSTRACT

A management server includes linear regression circuitry to receive the data as input data, based on the input data, the linear regression circuitry generates a linear regression line for the input data. Gradient circuitry analyzes angles between two points of data within the input data. In response to a first angle between a first point of data and a second point of data being greater than a threshold angle, the gradient circuitry determines that an interval of data including the first and second points of data is an abrupt interval, removes first data within the abrupt interval from the input data, and updates the linear regression line accordingly. Support vector machine circuitry receives the input data, classifies outliers in the input data, and removes the outliers. The linear regression line is updated based on the removal of the outliers.

17 Claims, 6 Drawing Sheets

(56) References Cited

U.S. PATENT DOCUMENTS

| | | | |
|---|---|---|---|
| 2013/0080375 A1* | 3/2013 | Viswanathan | G06F 11/076 706/52 |
| 2017/0235622 A1 | 8/2017 | Boyapalle et al. | |
| 2018/0225166 A1* | 8/2018 | Maya | G06F 17/18 |
| 2019/0095266 A1* | 3/2019 | Chen | G06N 5/022 |
| 2019/0311219 A1* | 10/2019 | Alabdulmohsin | G06F 16/9024 |
| 2020/0341832 A1* | 10/2020 | Poghosyan | G06F 11/3466 |
| 2021/0089377 A1* | 3/2021 | Wang | G06F 11/0778 |

\* cited by examiner

SYSTEM AND METHOD FOR IMPROVING SERVER USAGE BASED ON ANOMALY DETECTION

FIELD OF THE DISCLOSURE

The present disclosure generally relates to information handling systems, and more particularly relates to improving server usage based on anomaly detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

A management server includes linear regression circuitry to receive the data as input data, based on the input data, the linear regression circuitry may generate a linear regression line for the input data. Gradient circuitry may analyze angles between two points of data within the input data. In response to a first angle between a first point of data and a second point of data being greater than a threshold angle, the gradient circuitry may determine that an interval of data including the first and second points of data is an abrupt interval, remove first data within the abrupt interval from the input data, and update the linear regression line accordingly. Support vector machine circuitry may receive the input data, classify outliers in the input data, and remove the outliers. The linear regression line may be updated based on the removal of the outliers.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
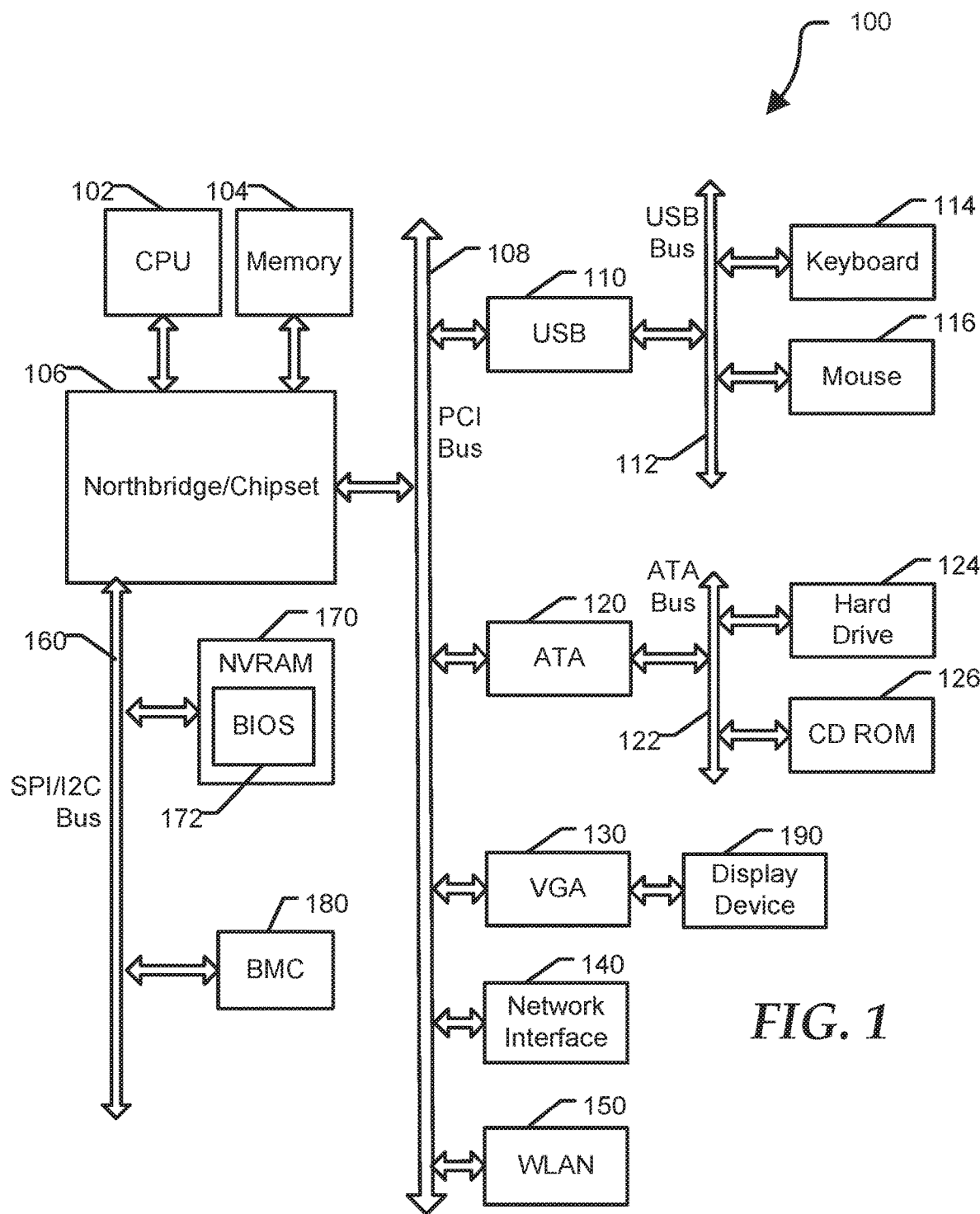
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
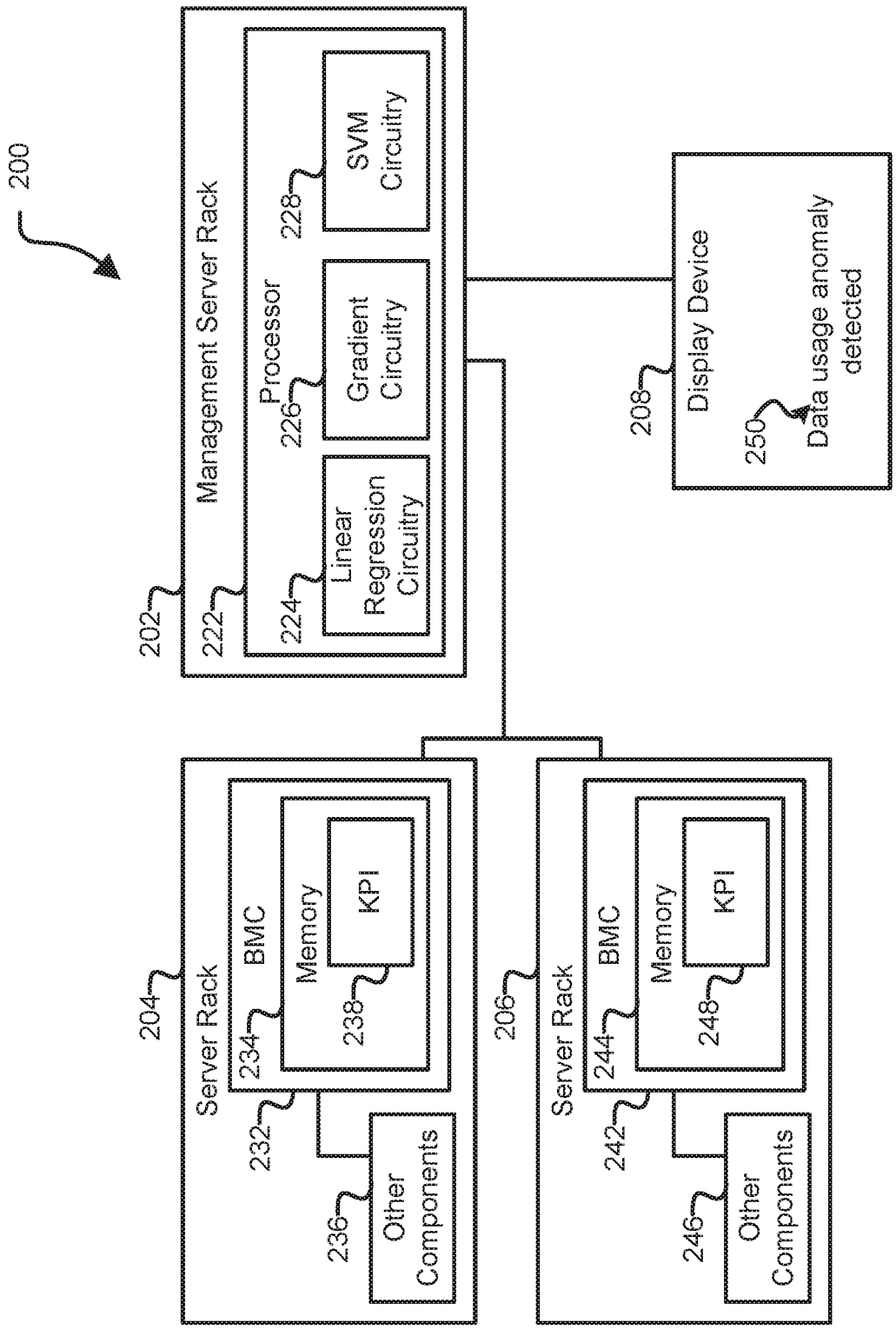
FIG. 2 is a block diagram of a portion of an information handling system that applies disk space metrics for anomaly detection according to at least one embodiment of the disclosure.

FIG. 2 shows a portion of an information handling system 200 for learning behavior of disk space metrics to detect an anomaly in the usage data according to at least one embodiment of the disclosure. Information handling system 200 includes a management server rack 202, server racks 204 and 206, and a display device 208. Management server rack 202 includes a processor 222, which in turn includes linear regression circuitry 224, gradient circuitry 226, and support vector machine (SVM) circuitry 228. In an example, regression circuitry 224, gradient circuitry 226, and SVM circuitry 228 may be any suitable devices or components to learn and monitor usage data metrics for anomaly detection within information handling system 200. For example, regression circuitry 224, gradient circuitry 226, and SVM circuitry 228 may be algorithms executed within processor 222. In another example, regression circuitry 224, gradient circuitry 226, and SVM circuitry 228 may be a dedicated hardware circuits, such as field gate programmable arrays (FPGAs), to perform the operations disclosed herein.

Server rack 204 includes any suitable components or devices including a baseboard management controller (BMC) 232, a memory 234, and other components 236. In an example, other components 236 may include any suitable components of a server rack, such as one or more servers, and each server may include one or more processors, one or more memory devices, one or more fans, one or more PCIe devices, or the like. Server rack 206 includes any suitable components or devices including, but not limited to, a BMC 242, a memory 244, and other components 246. In an example, other components 246 may include any suitable components of a server rack, such as one or more servers, and each server may include one or more processors, one or more memory devices, one or more fans, one or more PCIe devices, or the like. In an example, each of BMCs 232 and 242 may be any suitable type of controller, such as a BMC in accordance with an IPMI specification, an Integrated Dell Remote Access Controller (iDRAC), or the like. Information handling system 200 is described herein as a data center including multiple server racks and each server rack includes multiple servers, such as data storage servers. However, one of ordinary skill in the art would recognize that the operations described herein may be applied to a modular chassis system with multiple servers/sleds without varying from the scope of the disclosure.

Information handling system 200 may be employed, in whole or in part, by information handling system 100 illustrated in FIG. 1, or any other system, device, component, or the like operable to employ portions, or all of, the information handling system. In an example, information handling system 200 may include more components than shown in FIG. 2 without varying from the scope of this disclosure. For example, information handling system 200 may include more servers than servers 204 and 206. However, for clarity and brevity the description will be made with respect to only servers 204 and 206. Operation of information handling system 200 will be described with respect to FIGS. 2-4 below.

During operation, servers 204 and 206 may provide data storage for information handling system 200. However, if the capacity of one or more of the servers is exceeded, an experience of a user or customer of information handling system 200 may be impacted. In previous information handling systems, monitoring circuitry within the information handling system would monitor a current capacity of the servers and compare the current capacity as a percentage of capacity remaining to a threshold amount. In these systems, if the percentage of capacity remaining or utilized exceeds the threshold amount, a solution to correct the situation would be implemented. However, the solution may not be completed prior to the user experience being impacted. The combination of linear regression circuitry 224, gradient circuitry 226, and SVM circuitry 228, as disclosed herein, improves information handling system 200 by detecting an anomaly in usage data within servers 204 and 206, which in turn enables a solution or recovery to be implemented before the user experience is impacted.

In an example, BMC 232 may monitor the utilization of disk space in other components 236 of server 204. In an embodiment, BMC 232 may store the utilization of disk space as usage data in memory 234. Similarly, BMC 242 may monitor the utilization of disk space in other components 346 of server 306, and store the utilization of disk space as usage data in memory 244. In an example, the usage data may be any suitable data including, but not limited to, key performance indicator (KPI) data 238 or 248. In an embodiment, KPI data 238 may be stored in memory 234 and KPI data 348 may be stored in memory 244.

In an example, BMCs 232 and 242 may provide respective KPI usage data 238 and 248 to management server 202, which in turn may utilize the usage data to learn normal behavior of the disk spaces on servers 204 and 206. Management server 202 may also utilize the usage data 238 and 248 to train the components of processor 222, such as linear regression circuitry 224, gradient circuitry 226, and SVM circuitry 228. In certain examples, processor 222 may separately utilize usage data 238 and 248 to train linear regression circuitry 224, gradient circuitry 226, and SVM circuitry 228 to monitor for anomalies in the respective servers 204 and 206. In other examples, processor 222 may utilize usage data 238 and 248 together to train linear regression circuitry 224, gradient circuitry 226, and SVM circuitry 228 to monitor for anomalies in the entire information handling system 200, such as in both servers 204 and 206. Training of linear regression circuitry 224, gradient circuitry 226, and SVM circuitry 228 will be described with respect to FIG. 3.

Figure 3:
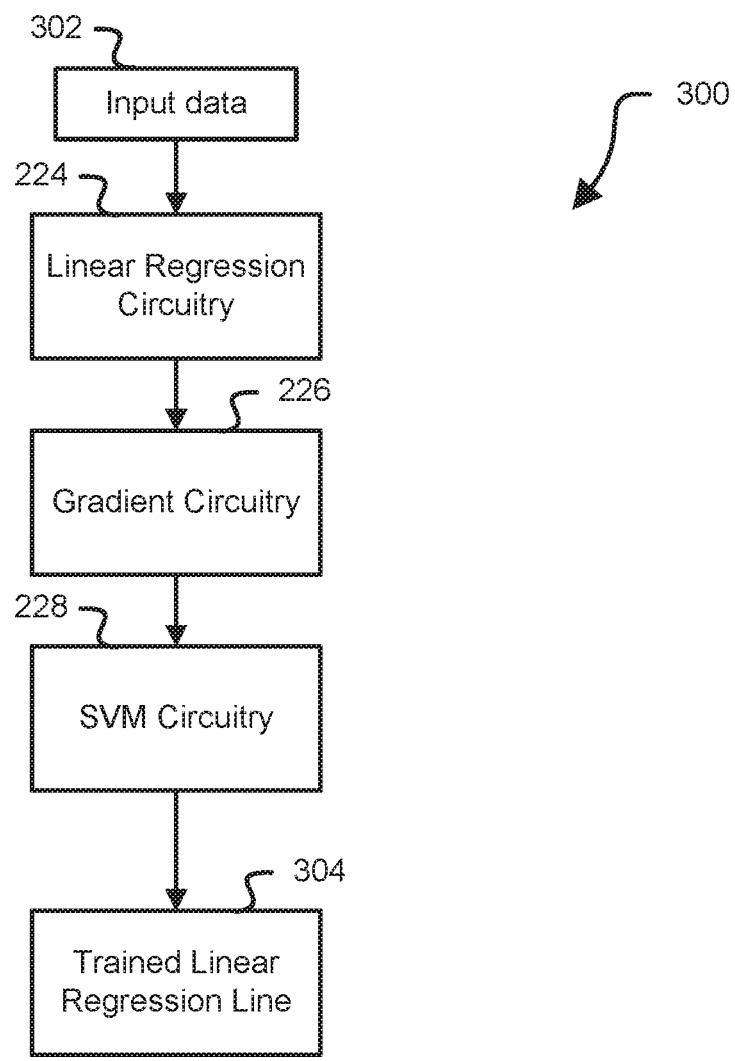
FIG. 3 is a diagram illustrating a training phase of monitoring the disk space metrics according to at least one embodiment of the disclosure.

FIG. 3 shows that during a training phase, input data 302, such as usage data 238 and/or 248 of FIG. 2, may be input to linear regression circuitry 224. In an example, the usage data 238 and/or 248 may be continually provided to linear regression circuitry 224, gradient circuitry 226, and SVM circuitry 228. In an embodiment, continually providing may refer to the input data 302 being provided at predetermined intervals, such as 1 second, 2 seconds, 5 seconds, 10 seconds, and 30 seconds. During the training phase, usage data 238 and/or 248 is utilized as training data. During a monitoring phase, usage data 238 and/or 248 is utilized for anomaly detection. In an example, the training phase may be implemented during a predetermined amount of time to enable linear regression circuitry 224, gradient circuitry 226, and SVM circuitry 228 to learn normal usage data for information handling system 200. In an embodiment, the predetermined amount of time may be any suitable amount of time including, but not limited to, 4 days, 5 days, 7 days, and 9 days.

In an example, the learning or training of linear regression circuitry 224, gradient circuitry 226, and SVM circuitry 228 as described herein is performed as unsupervised learning. For example, linear regression circuitry 224, gradient circuitry 226, and SVM circuitry 228 receive unlabeled input data 302 with the assumption that the majority of the data is normal usage data for disk space metrics. In an example, this assumption enables linear regression circuitry 224, gradient circuitry 226, and SVM circuitry 228 to learn to detect anomalies by looking for or analyzing data that seems to fit the least to the remainder of input data 302. However, the learning or training of linear regression circuitry 224, gradient circuitry 226, and SVM circuitry 228 may be performed by any other suitable method, such as supervised or semi-supervised learning without varying from the scope of this disclosure. In an example, supervised learning may include data sets that are labeled as normal data and abnormal data and training a classifier based on these different data sets. Semi-supervised learning may include training a model on a data set of normal usage data.

In an example, during the learning phase, a storage unit may activate linear regression circuitry 224, gradient circuitry 226, and SVM circuitry 228. In an example, the activation of these circuitries 224, 226, and 228 may initiate pattern recognition of input data 302. For example, linear regression circuitry 224 may receive input data 302 and be trained to determine an upper and lower boundary for the input data. In certain examples, linear regression circuitry 224 may analyze input data 302 to determine a linear regression line that fits to the majority of the input data, and may then create and/or determine the upper and lower boundaries for the linear regression line. In an example, the upper and lower boundaries may be values that are a particular percentage away from the average of input data 302. In an embodiment, the particular percentage may be any particular percentage including, but not limited to, 5%, 10%, 15%, and 20%.

In an example, during the training of linear regression circuitry 224, the linear regression circuitry may detect input data 302 that is outside the upper and lower boundaries. In response to this determination, input data 302 may be provided to gradient circuitry 226, which in turn may be trained to detect an abrupt change in input data 302. For example, gradient circuitry 226 may learn an angle or change between points of input data 302. In an embodiment, gradient circuitry 226 may determine that if a particular angle between two consecutive data points or samples calculates a coefficient degree that is greater than a particular amount. If so, gradient circuitry 226 may remove this interval of data so that the data is not used in the training of a final linear regression line. In an example, the particular degree is any suitable degree including, but not limited to, 25°, 30°, and 35°.

If gradient circuitry 226 determines that input data 302 is beyond the particular degree, the input data may be provided to SVM circuitry 228 for detection of outlier data. For example, SVM circuitry 228 may classify outlier data within input data 302. In an embodiment, outlier data is data that dramatically differs from all other data in input data 302. In response to detecting and classifying the outlier data, SVM circuitry 228 may remove the outlier data from input data 302 before the input data is utilized to create a trained linear regression line 304. Based on input data 302 without the outlier data and the interval of data with an angle that is too large, the training of linear regression circuitry 224, gradient circuitry 226, and SVM circuitry 228 may be completed with the trained linear regression line 304 being created for the input data. In an example, the removal of the outlier data may improve the learning and accuracy of linear regression circuitry 224. For example, a standard usage rate or other information from input data 302 may be recognized without the outlier data drastically changing the range of the input data. Once the standard is recognized, the trained linear regression line 304 may be generated. In an example, linear regression line 304 may be represented by the following equation:

$$c = m + n \qquad (EQ.1)$$

In equation 1 above, c is the load percentage of use of the metric represented by the data, t is time, m is an angle of the equation, and n is a distance measured in the y axis. In response to linear regression line 304 being generated, linear regression circuitry 224 may store the linear regression line for use during the monitoring phase.

Additionally, linear regression circuitry 224 may be trained as a function, such as a function represented by equation 1 above, that represents a relation between two points of input data 302. In an example, the function of linear regression circuitry 224 may be utilized to make predictions based on input data 302. In an embodiment, linear regression circuitry 224 may be a generation of a function that represents a data rate of disk space usage. In an example, based on the removal of the interval of data with an abrupt change, linear regression circuitry 224 may generate two lines similar to linear regression line 304. These two lines may intersect maximum and minimum points of a learning interval, and data points beyond this limit may be identified as possible alerts of an anomaly as described below with respect to FIG. 4.

The combination of training with all three circuitries 224, 226, and 228 improves the ability to monitor for anomalies as compared to training with just two of the circuitries. For example, if linear regression circuitry 224 and SVM circuitry 228 where trained together without gradient circuitry 226, linear regression line 304 may not be as accurate as described above because input data for training may include an interval of data that has an abrupt change in the data, such that the linear regression line would be changed to fit the abrupt change in the data. Similarly, if linear regression circuitry 224 and gradient circuitry 226 where trained together without SVM circuitry 228, linear regression line 304 may not be as accurate as described above because outlier data may not be classified and removed, such that the linear regression line be generated differently to fit to the outlier data.

Referring back to FIG. 3, upon linear regression circuitry 224, gradient circuitry 226, and SVM circuitry 228 learning the normal usage data for information handling system 200, processor 222 may utilize the circuitries for anomaly detection. The monitoring phase and anomaly detection will be described with respect to FIG. 4.

Figure 4:
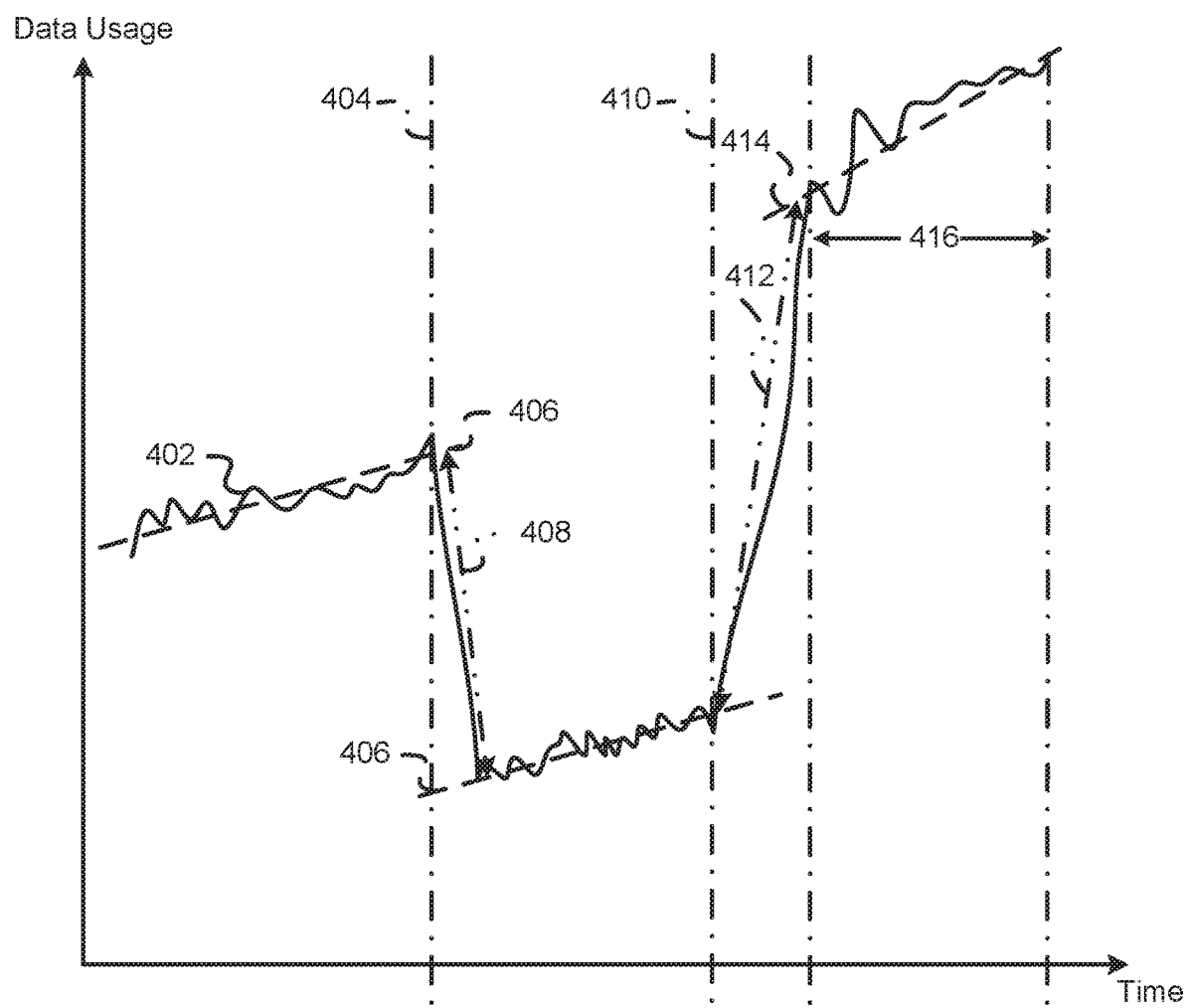
FIG. 4 is a diagram illustrating usage data within the information handling system according to at least one embodiment of the disclosure.

FIG. 4 shows usage data within the information handling system according to at least one embodiment of the disclosure. Usage data is illustrated by line 402 in FIG. 4. In an example, the usage data may be any suitable metric for determining disk space usage including, but not limited to, a percentage of a total capacity of disk space utilized. As shown, usage data 402 may increase and decrease over time. As described above, usage data 402 may be provided to linear regression circuitry 224, gradient circuitry 226, and SVM circuitry 228 that have been trained to detect anomalies in the data. In an example, linear regression circuitry 224 may monitor usage data 402 to determine whether the usage data remains within a particular percentage of a linear regression line. For example, linear regression circuitry 224 may determine that from the beginning of a monitoring phase until a point in time, indicated by line 404, usage data 402 remains within a particular percentage from linear regression line, indicated by line 406. In an example, the percentage that usage data 402 may be from linear regression line 406 may be any suitable percentage set by a user including, but not limited to, 5%, 10%, 12%, 15%, and 20%. However, at the point in time indicate by line 404, linear regression circuitry 224 may detect that usage data 402 no longer is within the particular percentage from linear regression line 406.

At this point, linear regression circuitry 224 may provide usage data 402 to gradient circuitry 226, which in turn may determine whether an angle or degree of change from one point of data to the next, as indicated by arrow 408, is within a predetermined allowable amount. In an example, usage data 402 may have the illustrated angle or degree of change for any suitable reason including, but not limited to, a user of information handling system 200 deleting data from the storage servers to free disk space. In response to gradient circuitry 226 determining that the angle or degree of change is within the predetermined allowable amount, no anomaly is detected, and linear regression circuitry 224 may again monitor usage data 402.

In an example, linear regression circuitry 224 may monitor usage data 402 to determine whether the usage data remains within a particular percentage of linear regression line 406. For example, linear regression circuitry 224 may determine that from the point in time that an amount of disk space was adjusted until a later point in time, indicated by line 410, usage data remains within the particular percentage from the linear regression line, indicated by line 406. However, at the point in time indicate by line 410, linear regression circuitry 224 may detect that usage data 402 is no longer within the particular percentage from linear regression line 406. At this point, linear regression circuitry 224 may provide usage data 402 to gradient circuitry 226, which in turn may determine whether the angle or degree of change from one point of data to the next, as indicated by arrow 412, is within a predetermined allowable amount. In response to gradient circuitry 226 determining that the angle or degree of change is not within the predetermined allowable amount, gradient circuitry 226 may provide usage data 402 to SVM circuitry 228, which in turn may determine whether the data points are outliers or an anomaly.

In an example, SVM circuitry 228 may perform one or more operations to analyze usage data 402 and determine whether an anomaly is present in the usage data. For example, SVM circuitry 228 may analyze a number of data points and the intensity of the data points in usage data 402 to determine whether an anomaly exists. In an example, SVM circuitry 228 may determine that usage data 402 is increasing at an intensity rate, as indicated by line 414, substantially greater than linear regression line 406. Thus, SVM circuitry 228 may determine an anomaly has been detected, such that an anomaly detection period is entered, as represented by arrow 416.

In an embodiment, SVM circuitry 228 may determine a length of time for the anomaly detection period 416, in any suitable manner, and perform one or more operations if the length of time exceeds a predetermined threshold. In an example, SVM circuitry 228 may determine a length of time that usage data continues as the rate indicated by line 414. In an embodiment, the predetermined threshold may be any suitable length of time including, but not limited to, 1 hour, 2 hours, 3 hours, 4 hours, and 5 hours. If the length of time that usage data 402 continues as the rate indicated by line 414 exceeds the predetermined threshold, SVM circuitry 228 may notify processor 222, which in may provide a warning message to a user of information handling system 200.

Referring back to FIG. 2, processor 222 may provide a warning message, such as usage data anomaly detected 250, to a display device 208, which in turn may display the warning message to a user of information handling 200. In an example, after display device 208 provides warning message 250 to the user, information handling system 200 may enter a recovery management period. In certain example, the recovery management period may include any suitable operations to reduce amount of disk spaced used before a capacity of disk space within information handling system 200 is exceeded. For example, the operations performed during the recovery management period may include, but are not limited to, adding, changing, or removing resources within information handling system 200 to increase the storage capacity within the information handling system.

In an example, after the recovery management period is completed, such that the utilized storage amount and usage is no longer going to exceed the available storage capacity of information handling system 200, processor 222 may retrain linear regression circuitry 224, gradient circuitry 226, and SVM circuitry 228 based on new usage data and new storage capacity. In an embodiment, the retraining of linear regression circuitry 224, gradient circuitry 226, and SVM circuitry 228 may be perform in the same manner as disclosed above.

In certain examples, the training or learning of usage data for disk space metrics for anomaly detection may be applied to memory usage and input/output (IO) demands without varying from the scope of this disclosure. For example, linear regression circuitry 224, gradient circuitry 226, and SVM circuitry 228 may be trained using input data for memory/CPU usage. When the training is completed, linear regression circuitry 224, gradient circuitry 226, and SVM circuitry 228 may monitor the memory usage and input/output (IO) demands for anomaly detection.

Figure 5:
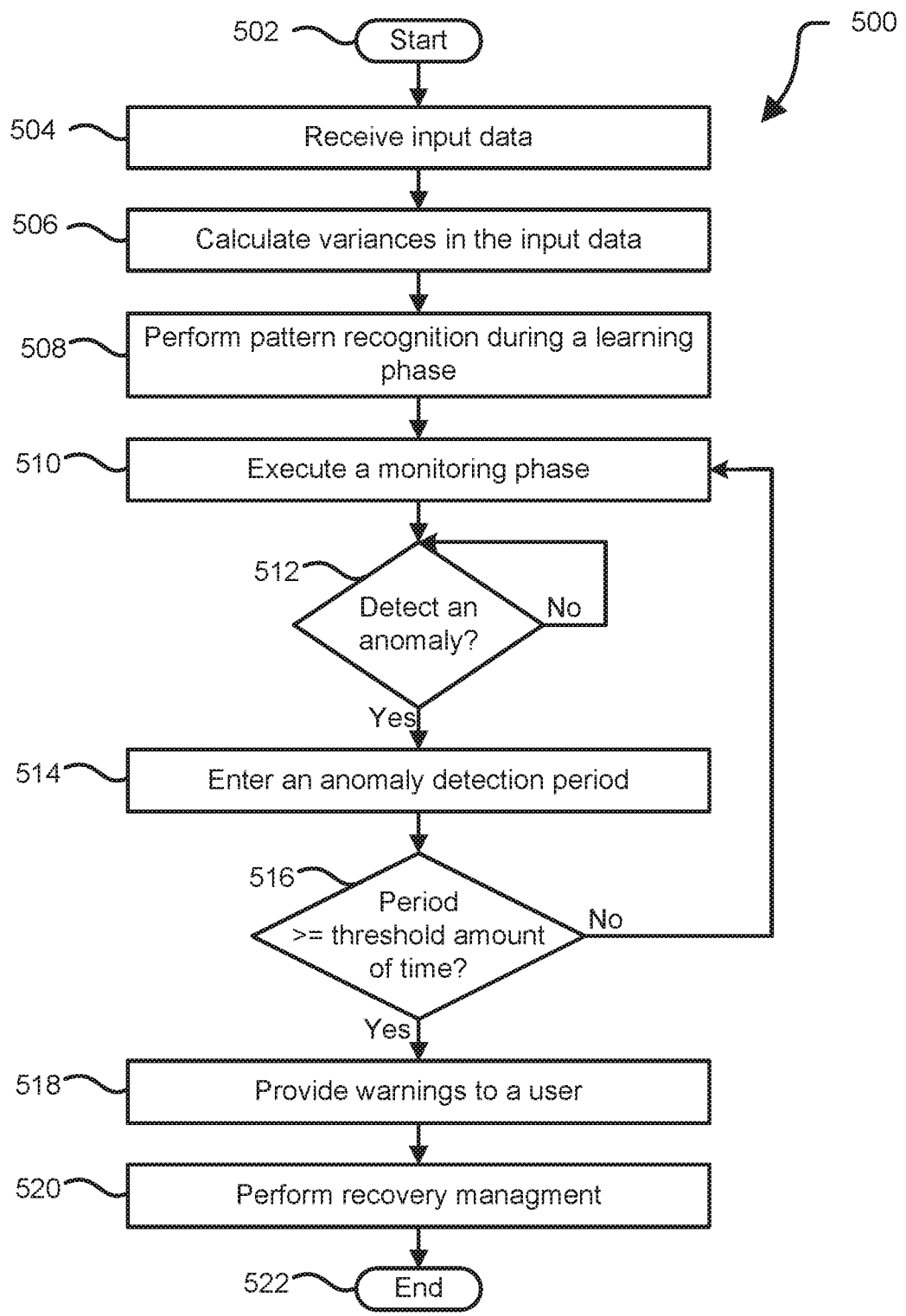
FIG. 5 is a flow diagram illustrating a method for applying disk space metrics for anomaly detection and monitoring for anomalies according to at least one embodiment of the disclosure.

FIG. 5 shows a method 500 for learning behavior of disk space metrics for anomaly detection according to at least one embodiment of the disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 5.

At block 504, input data is received. In an example, the input data may be any suitable data associated disk space usage in an information handling system. For example, the input data may include an hourly usage data, a daily usage data, a weekly usage data, or the like. At block 506, variances in the input data are calculated.

At block 508, pattern recognition within the input data is performed during a learning phase. In certain examples, the learning phase may be performed for any suitable length of time including, but not limited to, one or more hours, one or more days, and one or more weeks. In an example, during the learning phase, a DISK model may activate a support vector machine circuitry, linear regression circuitry, and gradient circuitries. In an example, the activation of these circuitries may initiate pattern recognition of the input data. For example, the linear regression circuitry may be trained as a function that represents a relation of the data. In an example, the function of the linear regression circuitry may be utilized to make predictions based on the input data. In an embodiment, the linear regression circuitry may be a generation of a function that represents a data rate of disk space usage. In an example, the gradient circuitry may be trained to detect an abrupt change in the input data. Additionally, the support vector machine circuitry may detect and treat outlier data, which may be data that dramatically differs from all other data.

At block 510, a monitoring phase is executed. During the monitoring phase, new data for disk space usage is monitored. In an example, the data may be continually received from one or more data servers that may record disk space metrics for the storage disks, such as a current usage data amount, a rate of usage, or the like. In certain example, the data may be continually received at any suitable interval including, but not limited to, 1 second, 2 seconds, 5 seconds, 10 seconds, and 30 seconds.

At block 512, a determination is made whether an anomaly in data is detected. In an example, the anomaly may be detected based on sequential analysis by the linear regression circuitry, the gradient circuitry, and the support vector machine circuitry. For example, first the linear regression circuitry may determine whether the data follows the particular rate of metric space usage. In response to the linear regression circuitry detecting that the data does not fit the straight line regression, the gradient circuitry may determine whether a degree of change from the straight line regression. If the gradient circuitry determines that the degree of change is greater than a threshold level, the support vector machine circuitry may determine whether the usage data change is an outlier or if the data no longer fits the within the predetermine usage data model. If the data no longer fits within the usage data model, an anomaly is detected.

In response to an anomaly being detected, an anomaly detection period is entered at block 514. In an example, the anomaly detection period may be any period of time that the current usage data for the disk space does not fit the trained usage data model. At block 516, a determination is made whether a length of time of the anomaly detection period is greater than or equal to a threshold amount of time. In an example, the threshold amount of time may be any suitable amount of time set by a user including, but not limited to, 1 hour, 2 hours, 3 hours, and 5 hours.

In response to the length of time of the anomaly detection period exceeding the threshold amount of time, a warning is provided to the user at block 518. In an example, the warning may indicate that the usage data exceeds the trained usage data model, such that disk space within an information handling system may be consumed quickly.

At block 520, a recovery management action is performed. In an example, the recovery management action may be any suitable action to increase disk space within the information handling system including, but not limited to, deleting data from storage servers, adding memory components to existing storage servers, adding additional storage servers, and stopping operations that are exceeding the trained usage data model. Additionally, the usage data anomaly circuitry, such as the linear regression circuitry, the gradient circuitry, and the support vector machine circuitry, may be restarted as described above at block 504. Thus, the method ends at block 522 and may begin again at block 502.

Figure 6:
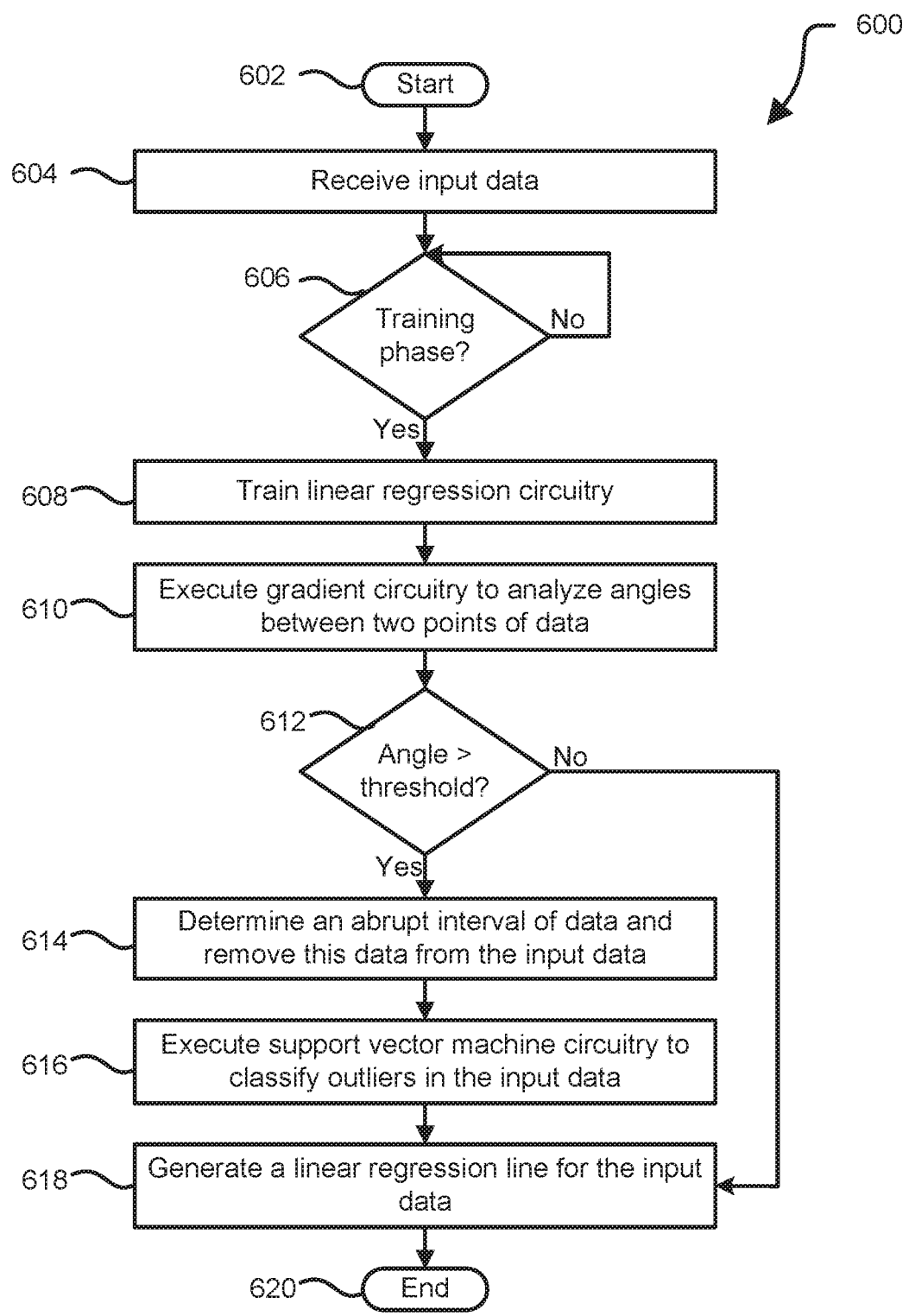
FIG. 6 is a flow diagram illustrating another method for applying disk space metrics for anomaly detection according to at least one embodiment of the disclosure.

FIG. 6 shows another method for learning behavior of disk space metrics for anomaly detection according to at least one embodiment of the disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 6.

At block 604, input data is received. In an example, the input data may be received at a processor of an information handling system, and input data may represent a metric of the information handling system. In an embodiment, the input data is periodically received during both a training phase and a monitoring phase.

At block 606, a determination is made whether a training phase has been entered. In response to the training phase being entered, linear regression circuitry is executed to detect a normalize range of data in the input data at block 608. In an example, the linear regression circuitry may determine a linear regression line that fits to the majority of the input data, and may then create and/or determine the upper and lower boundaries for the linear regression line. In an example, the upper and lower boundaries may be values that are a particular percentage away from the average of input data 302. At block 610, gradient circuitry is executed to analyze angles between two points of data within the input data. At block 612, a determination is made whether a first angle between a first point of data and a second point of data is greater than a threshold angle. If the first angle is not greater than the threshold angle, the flow continues at block 618. However, if the first angle is greater than the threshold angle, the flow continues at block 614.

At block 614, an interval of data including the first and second points of data determined to be an abrupt interval, and this data is removed from the input data. At block 618, support vector circuitry is executed to classify outliers in the input data. In an example, if the angle was determined to be larger than the threshold angle at block 612, the input data does not include the data within the abrupt angle and outlier data is removed from the input data at block 616. At block 618, a linear regression line is generated for the input data. In an example, the linear regression line may indicate a pattern of within the input data without the data within the interval determined to be an abrupt angle and without the outlier data. The method ends at block 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a first server to collect data associated with a metric of the first server; and
   a management server to receive the data from the first server, the management server including:
      linear regression circuitry to receive the data as input data, and based on the input data the linear regression circuitry to generate a linear regression line for the input data, wherein the linear regression line indicates a pattern within the input data;
      gradient circuitry to analyze angles between two points of data within the input data; in response to a first angle between a first point of data and a second point of data being greater than a threshold angle, to determine that an interval of data including the first and second points of data is an abrupt interval; and to remove first data within the abrupt interval from the input data to update the linear regression line; and
      support vector machine circuitry to receive the input data, to classify outliers in the input data, and to remove the outliers, wherein the linear regression line is updated based on the removal of the outliers wherein during the monitoring phase and in response to the detection of the anomaly: the management server to enter into an anomaly detection period; in response to an amount of time within the anomaly detection period being greater than a predetermined amount of time, entering, by the processor, into a recovery management period; and during the recovery management period, performing an operation to increase storage capacity within the information handling system.

2. The information handling system of claim 1, wherein during the monitoring phase: the linear regression circuitry to determine whether the input data is within a predetermined percentage of the linear regression line, in response to the input data not being within the predetermined percentage of the linear regression line, the gradient circuitry to determine whether a second angle between a second point of data and a third point of data is greater than the threshold angle, in response to the second angle being greater than the threshold angle, the support vector machine circuitry to determine an intensity of change within the input data received after the determination that the second angle is greater than the threshold angle, and in response to the intensity of change being greater than a threshold, the support vector machine circuitry to detect the anomaly within the input data.

3. The information handling system of claim 2, wherein during the monitoring phase and in response to the detection of the anomaly: the management server to enter remain in the anomaly detection period while the intensity of change remains greater than the threshold, to determine whether an amount of time within the anomaly detection period is greater than a predetermined amount of time.

4. The information handling system of claim 3, further comprising:
   a display device to communicate with the management server, in response to the amount of time within the anomaly detection period being greater than the predetermined amount of time, the display device to provide a warning message to a user of the information handling system.

5. The information handling system of claim 2, wherein the detection of the anomaly indicates that a rate of storage capacity usage of a disk space within the information handling system has increased to a level that will exceed a storage capacity of the disk space.

6. The information handling system of claim 1, wherein the angle between the two points of data is a degree of change between the two points.

7. A method, comprising:
   receiving, at a processor of an information handling system, input data for a metric of the information handling system, wherein the input data is periodically received during both a training phase and a monitoring phase; and
   during the training phase:
      training, by the processor, linear regression circuitry based on the input data;
      generating, based on the training of the linear regression circuitry, a linear regression line for the input data, wherein the linear regression line indicates a pattern within the input data;
      executing, by the processor, gradient circuitry to analyze angles between two points of data within the input data;
      in response to a first angle between a first point of data and a second point of data being greater than a threshold angle, determining, by the gradient circuitry, that an interval of data including the first and second points of data is an abrupt interval;
      removing first data within the abrupt interval from the input data;
      executing, by the processor, support vector machine circuitry to classify outliers in the input data;
      removing the outliers from the input data; and
      updating, the removing of the first data and the removing of the outliers, the linear regression line for the input data; and
   during the monitoring phase:
      in response to a detection of an anomaly, entering, by the processor, into an anomaly detection period;
      in response to an amount of time within the anomaly detection period being greater than a predetermined amount of time, entering, by the processor, into a recovery management period; and during the recovery management period, performing an operation to increase storage capacity within the information handling system.

8. The method of claim 7, further comprising:
during the monitoring phase:
   determining, by the linear regression circuitry, whether the input data is within a predetermined percentage of the linear regression line;
   in response to the input data not being within the predetermined percentage of the linear regression line, determining, by the gradient circuitry, whether a second angle between a second point of data and a third point of data is greater than the threshold angle;
   in response to the second angle being greater than the threshold angle, determining, by the support vector machine circuitry, an intensity of change within the input data received after the determination that the second angle is greater than the threshold angle; and
   in response to the intensity of change being greater than a threshold, detecting the anomaly within the input data.

9. The method of claim 8, further comprising:
remaining in the anomaly detection period while the intensity of change remains greater than the threshold; and
determining, by the processor, whether the amount of time within the anomaly detection period is greater than the predetermined amount of time.

10. The method of claim 9, further comprising:
in response to the amount of time within the anomaly detection period being greater than the predetermined amount of time, providing, by a display device of the information handling system, a warning message to a user of the information handling system.

11. The method of claim 8, wherein the detecting of the anomaly indicates that a rate of storage capacity usage of a disk space within the information handling system has increased to a level that will exceed a storage capacity of the disk space.

12. The method of claim 7, wherein the angle between two points of data is a degree of change between the two points.

13. A method, comprising:
receiving, at a processor of an information handling system, input data for a metric of the information handling system, wherein the input data is periodically received during both a training phase and a monitoring phase;
during the training phase:
   training, by the processor, linear regression circuitry based on the input data;
   generating, based on the training of the linear regression circuitry, a linear regression line for the input data, wherein the linear regression line indicates a pattern within the input data;
   executing, by the processor, gradient circuitry to analyze angles between two points of data within the input data;
   in response to a first angle between a first point of data and a second point of data being greater than a threshold angle, determining, by the gradient circuitry, that an interval of data including the first and second points of data is an abrupt interval;
   removing first data within the abrupt interval from the input data;
   executing, by the processor, support vector machine circuitry to classify outliers in the input data;
   removing the outliers from the input data; and
   updating, based on the removing of the first data and the removing of the outliers, the linear regression line for the input data; and
during the monitoring phase:
   determining, by the linear regression circuitry, the gradient circuitry, and the support vector machine, whether an anomaly is detected within the input data;
   in response to the anomaly being detected, entering into an anomaly detection period;
   in response to the anomaly detection period, providing, by a display device of the information handling system, a warning message to a user of the information handling system;
   in response to a detection of an anomaly, entering, by the processor, into an anomaly detection period;
   in response to an amount of time within the anomaly detection period being greater than a predetermined amount of time, entering, by the processor, into a recovery management period; and
during the recovery management period, performing an operation to increase storage capacity within the information handling system.

14. The method of claim 13, wherein the determining of whether the anomaly is detected within the input data further comprises:
determining, by the linear regression circuitry, whether the input data is within a predetermined percentage of the linear regression line;
in response to the input data not being within the predetermined percentage of the linear regression line, determining, by the gradient circuitry, whether a second angle between a second point of data and a third point of data is greater than the threshold angle;
in response to the second angle being greater than the threshold angle, determining, by the support vector machine circuitry, an intensity of change within the input data received after the determination that the second angle is greater than the threshold angle; and
in response to the intensity of change being greater than a threshold, detecting the anomaly within the input data.

15. The method of claim 13, further comprising:
remaining in the anomaly detection period while the intensity of change remains greater than the threshold;
determining, by the processor, whether an amount of time within the anomaly detection period is greater than a predetermined amount of time;
in response to the amount of time within the anomaly detection period being greater than the predetermined amount of time, entering, by the processor, into a recovery management period.

16. The method of claim 13, wherein the detecting of the anomaly indicates that a rate of storage capacity usage of a disk space within the information handling system has increased to a level that will exceed a storage capacity of the disk space.

17. The method of claim 13, wherein the angle between the two points of data is a degree of change between the two points.

* * * * *